Jan. 25, 1938.  C. C. SCHWEISO  2,106,507
THERMOMETER
Filed April 2, 1934  9 Sheets-Sheet 1
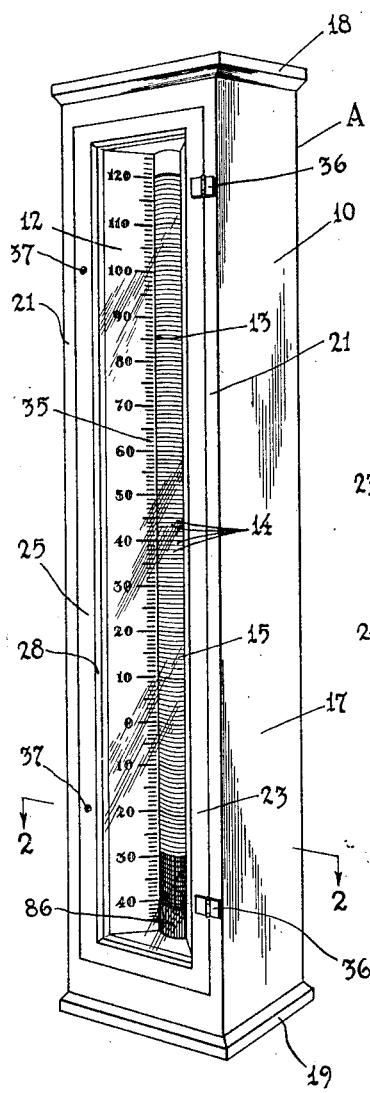
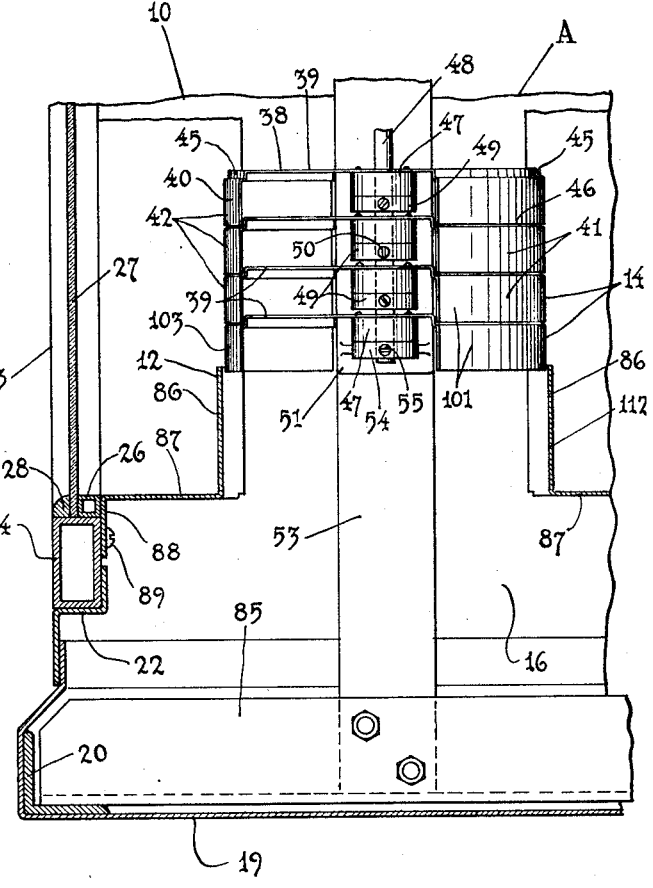
Inventor
Clifford C. Schweiso
By Caswell & Lagaard
Attorneys

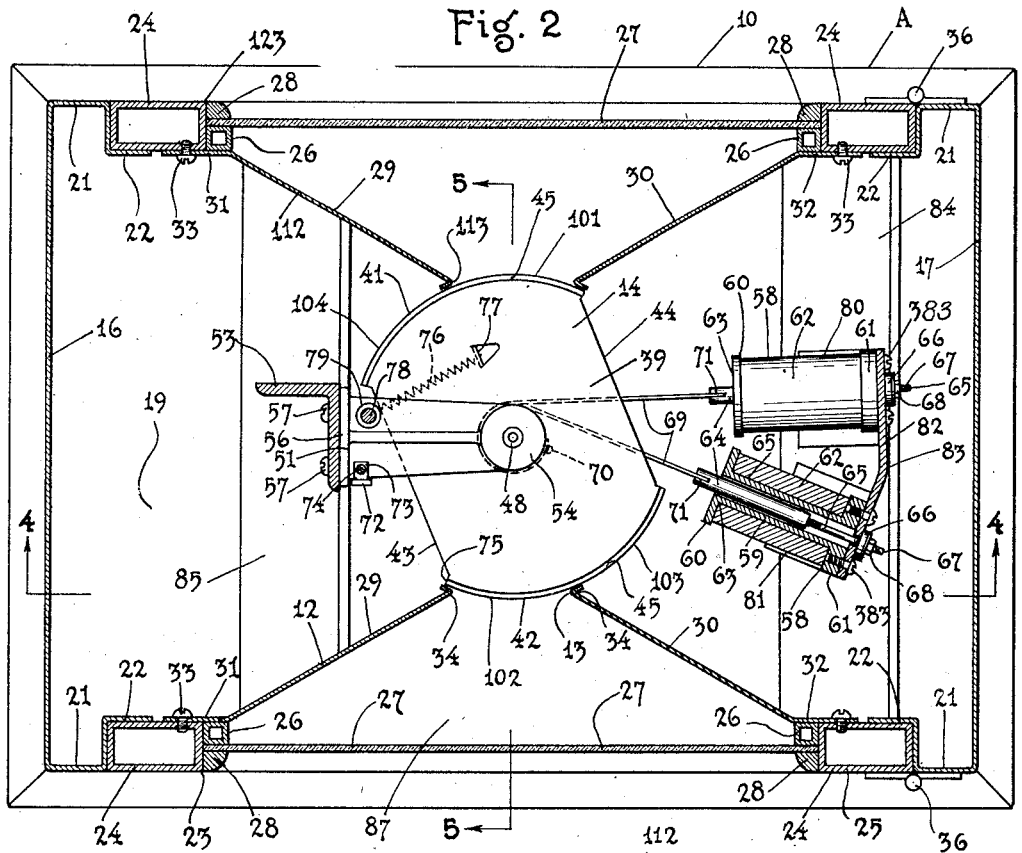
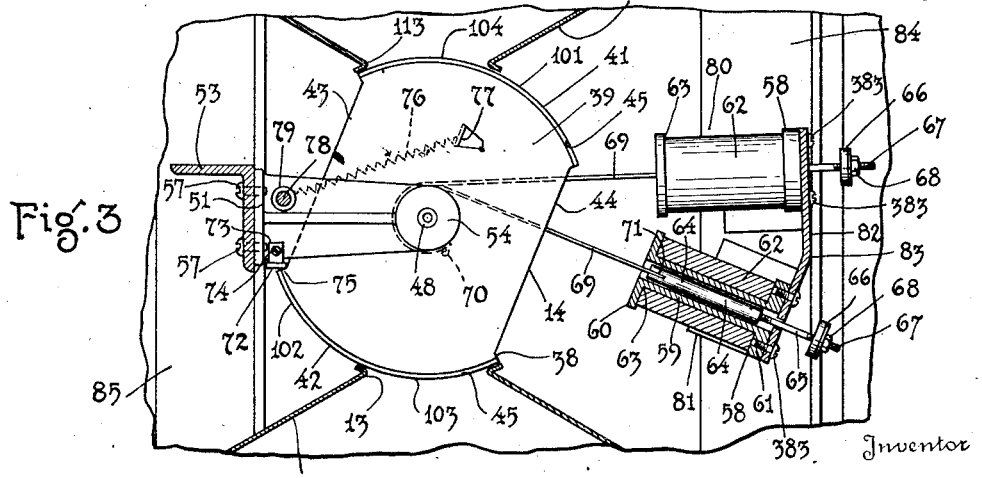

Jan. 25, 1938.  C. C. SCHWEISO  2,106,507
THERMOMETER
Filed April 2, 1934  9 Sheets-Sheet 3

Inventor
Clifford C. Schweiso
By Crowell & Lagaard
Attorneys

Jan. 25, 1938.  C. C. SCHWEISO  2,106,507
THERMOMETER
Filed April 2, 1934  9 Sheets-Sheet 4

Inventor
Clifford C. Schweiso
By Crowell & Lagaard
Attorneys

Jan. 25, 1938.  C. C. SCHWEISO  2,106,507
THERMOMETER
Filed April 2, 1934   9 Sheets-Sheet 5

Inventor
Clifford C. Schweiso

By Caswell & Lagaard
Attorneys

Jan. 25, 1938.  C. C. SCHWEISO  2,106,507
THERMOMETER
Filed April 2, 1934   9 Sheets-Sheet 6

Inventor
Clifford C. Schweiso
Caswell & Lagaard
Attorneys

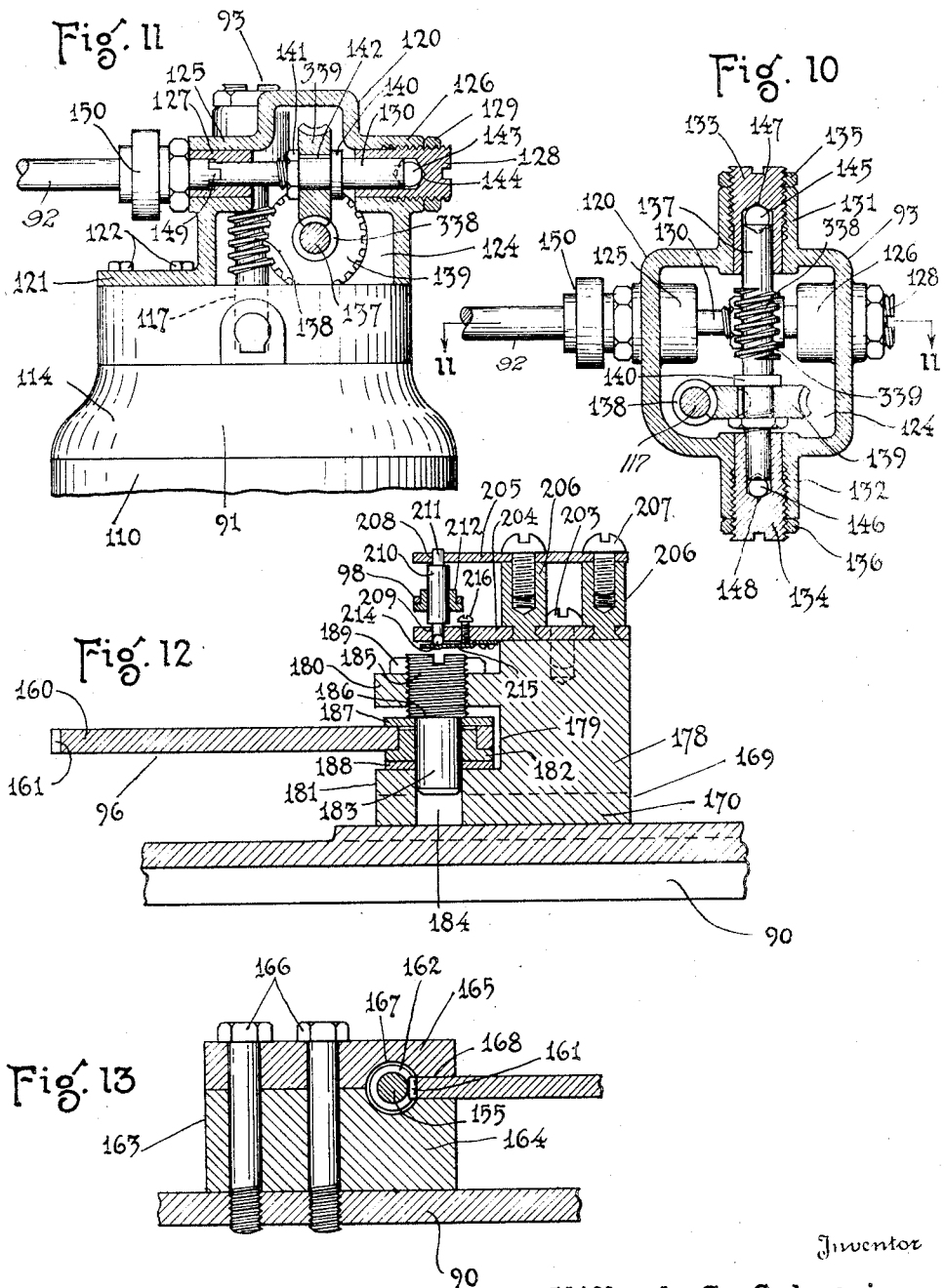

Jan. 25, 1938.　　　　C. C. SCHWEISO　　　　2,106,507
THERMOMETER
Filed April 2, 1934　　　　9 Sheets-Sheet 8
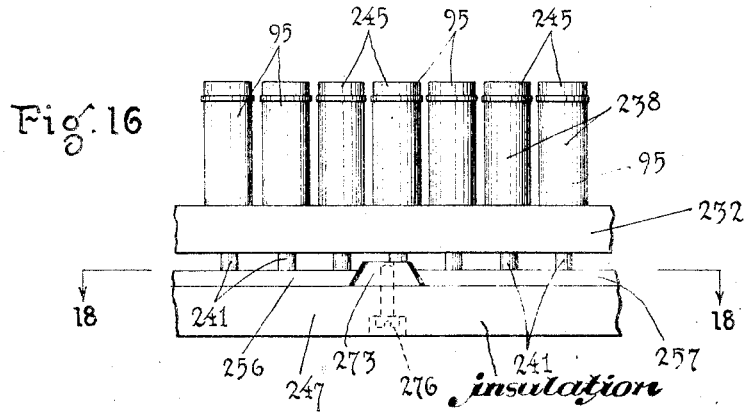
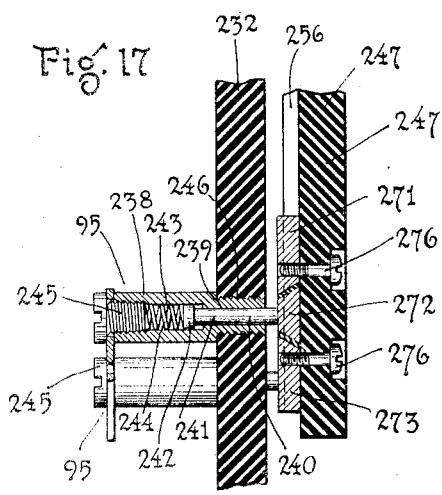
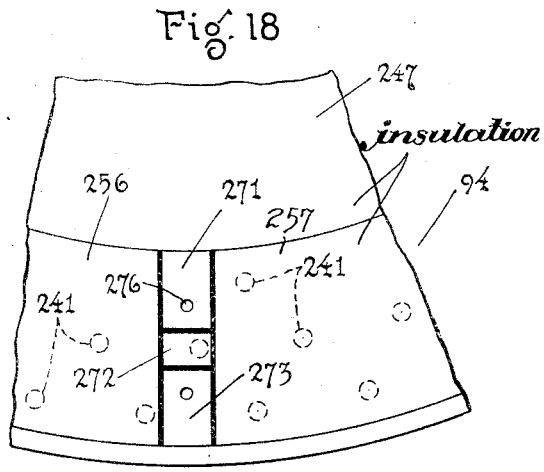
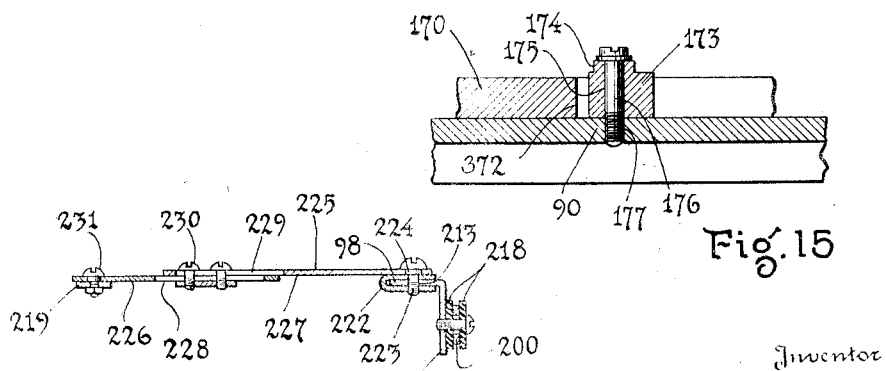
Inventor
Clifford C. Schweiso
Caswell + Lagaard
Attorneys Jan. 25, 1938.     C. C. SCHWEISO     2,106,507
THERMOMETER
Filed April 2, 1934     9 Sheets-Sheet 9

Inventor
Clifford C. Schweiso
By Crowell & Lagaard
Attorneys

Patented Jan. 25, 1938

2,106,507

UNITED STATES PATENT OFFICE 2,106,507

THERMOMETER

Clifford C. Schweiso, Minneapolis, Minn., assignor to O. B. McClintock Company, Minneapolis, Minn., a corporation of Minnesota Application April 2, 1934, Serial No. 718,551

11 Claims. (Cl. 177—351)

My invention relates to thermometers and particularly to thermometers of relatively large proportions simulating in appearance an ordinary liquid column thermometer.

An object of the invention resides in constructing the thermometer with means forming an elongated scale and with a plurality of indicating members extending along said scale and adapted to conjointly indicate in the same manner as the column of an ordinary thermometer the ambient temperature.

Another object of the invention resides in providing a control device whereby relatively small movement of the actuating device is converted into greater movement of other parts of the control device.

A still further object of the invention resides in constructing said members with indicating means and in mounting said members for movement into a position to bring said indicating means into indicating position with reference to the scale.

A specific object of the invention resides in pivotally mounting said members for swinging movement to bring the indicating means into indicating position.

A still further object of the invention resides in pivoting said members for coaxial movement and in constructing said members with cylindrical surfaces adapted to simulate in appearance the column of the thermometer.

A feature of the invention resides in providing the thermometer with a bezel along which the scale is disposed and in forming said cylindrical surfaces with two parts, one colored red or some other suitable color and the other colored white and in shifting the members so as to alternately bring said colored parts of the members into register with said bezel.

An object of the invention resides in providing separate actuating means for independently actuating each of said indicating members.

A still further object of the invention resides in employing electrically energized actuating means for each of said members and in utilizing a circuit for each member whereby said members may be operated by remote control.

Another object of the invention resides in providing a plurality of switches for operating said circuits.

A still further object of the invention resides in providing temperature controlled means for successively operating said switches.

A feature of the invention resides in arranging said switches in circular formation and in providing a rotating member operated by the temperature controlled means for successively operating the switches.

An object of the invention resides in providing an electric motor and suitable transmission mechanism for rotating said member and in employing a control switch for starting and stopping said motor.

A still further object of the invention resides in utilizing the temperature controlled means for operating said control switch.

Another object of the invention resides in employing a movable carriage carrying said control switch and moved by said electric motor, said member causing the control switch to travel along a predetermined path.

An object of the invention resides in providing an operating member for operating said control switch, said operating member being operated by the temperature controlled means and moving along the same path as said control switch.

A feature of the invention resides in pivoting said carriage and in utilizing as said operating member a swinging arm cooperating therewith and operated by the temperature controlled means.

Another object of the invention resides in concentrically pivoting said arm and carriage.

Other objects of the invention reside in the novel combination and arrangement of parts and in the details of construction hereinafter illustrated and/or described.

In the drawings:

Fig. 1 is a perspective view of a part of the invention embodying the indicating column.

Fig. 2 is a plan sectional view taken on line 2—2 of Fig. 1.

Fig. 3 is a fragmentary plan sectional view of a portion of the structure shown in Fig. 2 with the parts in altered position.

Fig. 5 is an elevational sectional view of the lower portion of the structure shown in Fig. 1 and taken on line 5—5 of Fig. 2.

Fig. 10 is an elevational sectional detail view of the transmission mechanism of the invention taken on line 10—10 of Fig. 6.

Fig. 11 is a plan sectional view of the structure shown in Fig. 10 and a portion of the supporting member therefor taken on line 11—11 of Fig. 10.

Fig. 12 is an elevational sectional detail view taken on line 12—12 of Fig. 6.

Fig. 13 is an elevational sectional detail view taken on line 13—13 of Fig. 6.

Fig. 14 is an elevational sectional detail view taken on line 14—14 of Fig. 6.

Fig. 15 is an elevational sectional detail view taken on line 15—15 of Fig. 6.

Fig. 16 is a fragmentary elevational view taken on line 16—16 of Fig. 8.

Fig. 17 is a fragmentary elevational sectional view taken on line 17—17 of Fig. 8.

Fig. 18 is an elevational view of a portion of the switch operating mechanism taken on line 18—18 of Fig. 16.

Figure 4:
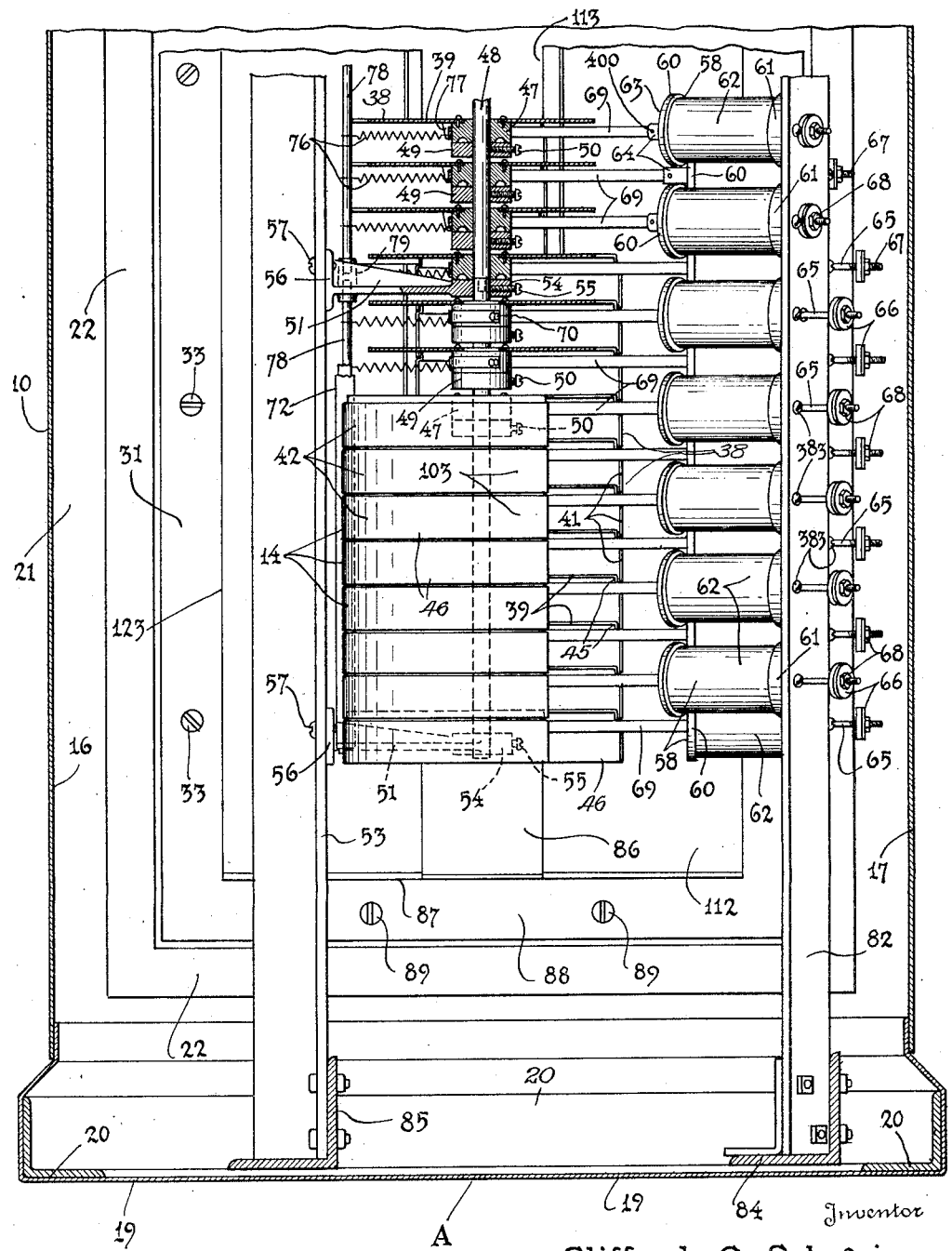
Fig. 4 is an elevational sectional view taken on line 4—4 of Fig. 2.

My invention proper comprises two parts, an indicating mechanism indicated in its entirety by the reference character A and an operating mechanism therefor indicated in its entirety by the reference character B. The indicating mechanism A may be placed at any locality desired as for example upon the exterior of a building or at any locality where the same is readily visible to the public. The mechanism B is situated within a building or at any other suitable locality where electric current can be procured and is adapted to operate the mechanism A through remote control. The various parts of these two mechanisms will now be described in detail.

The mechanism A consists of a case 10 which is constructed with a door 23 at the forward portion thereof and having a window therein through which the interior of the case may be viewed, and with a similar door 123 at the rear thereof serving the same purpose. Within the case 10 are disposed two bezels 12 and 112 constructed to form elongated openings 13 and 113 visible through the windows in the doors 23 and 123. In back of the window 13 is provided a plurality of indicating members 14 which are arranged to conjointly form an indicating column 15 simulating in appearance the column of liquid contained within the ordinary mercury or spirit thermometer.

The case 10 is constructed from sheet metal, wood or some other suitable material and comprises sides 16 and 17 connected together at the top through a cap 18 and at the bottom through a base 19. These parts may be welded or otherwise secured together to form a rigid and substantial construction. At the corners of the base 19 are provided angles 20 which serve to stiffen and reinforce the base and to provide a rigid construction for the entire case. At the front and back of the case 10 are provided strips of metal 21 which extend along the walls 16 and 17 and which are bent to form rabbets 22 in which the two doors 23 and 123 fit. These doors are constructed from tubular material indicated at 24 to form a frame 25 extending along the rabbet 22 and lying flush with the portions 21 of the case. Along the inner edges of the frame 25 is provided a bead 26 against which a pane of glass 27 rests. This glass is held in place through a molding 28 which may be screwed to the frame 25 or secured thereto in any desired manner.

The two panes of glass 27 of the doors 23 and 123 serve as windows by means of which the column 15 disposed within the interior of the case 10 may be viewed. Doors 23 and 123 are hingedly connected to the members 21 of the case 10 through hinges 36 and may be locked in place through locks 37 attached to the said door and engaging the case in the usual manner.

Bezels 12 and 112 being identical in construction, only bezel 12 will be described in detail. This bezel consists of two sheets of metal 29 and 30 which are constructed with flanges 31 and 32 secured to the frame 25 of door 23 through screws 33. The flanges 31 and 32 are bent from the sheets 29 and 30 so that the said sheets extend diagonally inwardly toward one another as best shown in Figs. 1 and 2. The extreme ends 34 of these sheets are turned back as indicated in Fig. 2 and are spaced from one another to form the vertical slot or window 13 previously referred to. Along the outwardly exposed surface of the sheet 29 is printed or otherwise formed a scale 35 which is calibrated to read in degrees Fahrenheit or to any other scale desired. A similar scale may also be printed on the sheet 30.

The column 15 consists of a plurality of superimposed members 14 best illustrated in Figs. 2 and 4. Each of these members being identical in construction only one thereof will be described. The member 14 comprises an inverted cup-like stamping 38 formed with a radial wall 39 and two circumferential walls 41 and 42 disposed diametrically opposite one another and spaced from one another as indicated at 43 and 44. The cylindrical walls 41 and 42 are constructed at the upper ends thereof with offsets 45 into which the lower edges 46 of the cylindrical walls of the superimposed indicating member may be received. By means of this construction continuity of the column is procured so that no break appears between the various members. The cylindrical walls 41 and 42 are of a circumferential width somewhat greater than twice the width of the windows 13 and 113. These walls have painted upon them or otherwise applied thereto two areas of coloring best shown in Fig. 1. The two walls 41 and 42 are preferably white at the areas thereof designated at 101 and 102 and are preferably colored at the adjoining areas thereof designated by the numerals 103 and 104. The division of coloring occurs along vertical lines at the centers of the two cylindrical walls 41 and 42. The radial wall 39 of member 14 is riveted to a drum 47 which is rotatably mounted upon a vertically extending shaft 48 situated symmetrically with respect to the two windows 13 and 113. These drums rest upon collars 49 secured to the shaft 48 through set screws 50 and thus rotatably support the indicating members for movement from a position shown in Fig. 2 to a position shown in Fig. 3 and vice versa.

The shaft 48 is supported through a number of brackets 51, which are attached to a vertically extending angle member 53. Angle member 53 is supported on a base angle 85 carried by the base 19 which angle member extends across and is secured to angles 20. Angle member 53 is further attached to a similar angle member mounted in cap 18, but not illustrated. The brackets 51 are formed with bosses 54 through which the shaft 48 extends and the said shaft is held rigidly attached to said bosses through set screws 55. Brackets 51 are further constructed with legs 56 which abut against the angle member 53 and which are bolted to said angle member through bolts or screws 57. If desired, the shaft 48 may be made sectional in which case the sections are joined at the brackets 51. Such construction permits of building the thermometer in units. Less units would hence be required for thermometers operated in warm climates, thereby reducing the cost of such thermometers.

The member 14 is operated through an electromagnet 58. This magnet is provided with a spool 63 formed with a tube 59 and ends 60 and 61. A coil 62 of insulated wire is wound upon the spool 63. Within the tube 59 is slidably mounted an iron core 64. This core has attached to it a guide rod 65 which extends through the end 61 of the spool 63, which rod is externally threaded at its outer end as indicated at 67. A bumper washer 66 is adjustably positioned upon the threaded end 67 of said rod and is held in position thereon through a nut 68. The washer 66 is adapted to engage the supporting structure for the electromagnet and forms a stop for limiting the outward movement of the core 64 and the structure controlled thereby.

Upon the drum 47 is wound a flat metallic ribbon 69 which is attached to the said drum through a screw 70. This ribbon is likewise attached to the core 64 which is slotted as indicated at 71 to receive the same. Ribbon 69 is pivoted to the core 64 by means of a pin 400 which passes jointly through said ribbon and core. Ribbon 69 passes through the opening 44 formed between the two cylindrical walls 41 and 42 of the member 14, which arrangement of parts is best shown in Fig. 4. When the indicating member 14 is in the position shown in Fig. 2, core 64 is outermost and the ribbon 69 is wound the maximum amount upon the drum 47. When said core is drawn innermost into the electromagnet proper, the member 14 is rotated through the ribbon 69, taking the position shown in Fig. 3. For the purpose of limiting the movement of the member 14 when in its position shown in Fig. 2, the bumper 66 and the adjusting nuts 68 are employed.

For limiting the movement of the member 14 when the same arrives at its position shown in Fig. 3, a stop bar 72 is employed which is attached to the various brackets 51, and which extends vertically throughout the height of the device. This stop bar is formed with lugs 73 which are secured to the said brackets through screws 74. The free edge 75 of the cylindrical wall 42 of member 14 is adapted to engage this stop bar and to limit the movement of said member 14.

Member 14 is normally held in the position shown in Fig. 2 through a tension coil spring 76 which is attached at one end to a lug 77 struck out of the metal of the radial wall 39 of said member 14. The spring 76 is attached at its other end to a vertically extending rod 78 which is attached to the various brackets 51. This rod may be made in sections similar to the shaft 48 in which case certain of the sections are screwed at one end into suitable bosses 79 formed on the various brackets 51. When current is applied to the electromagnet 58 core 64 is drawn inwardly and the member 14 rotated from its position shown in Fig. 2 to that shown in Fig. 3 against the action of the spring 76.

The height of the exposed portions of the cylindrical walls 41 and 42 of the members 14 is preferably such that said members correspond to a temperature increment of not over two degrees. These members may however be made of any height desired. When so constructed the electromagnets 58 have a diameter somewhat greater than the height of said members. To permit of utilizing such members, the electromagnets 58 are preferably arranged in two groups 80 and 81, and staggered as most clearly shown in Fig. 2. For the purpose of supporting the said electromagnets, an upright 82 is employed which is bent as indicated at 83 to cause the adjoining parts thereof to fit against the ends 61 of the spool 63 of said magnets. The various electromagnets are attached to the upright 82 through screws 383 which are threaded into the ends 61. In this manner the height of the members 14 may be made as little as one-half the diameter of the said electromagnets. The upright 82 is secured to an angle base member 84 supported on the base 19 and to a similar member secured to cap 18, but not illustrated.

Where the thermometer is operated in relatively warm climates, it becomes unnecessary to continue the members 14 below the minimum temperature mark on the scale 35. To complete the column 15 two segmental shaped members 86 are employed which are shown in Fig. 5. These members are situated at the lower end of said column and conform to the shape of the column 15. The segmental shaped members 86 are attached to a plate 87 which is constructed with a flange 88. Plate 87 fits up against the ends of the sheets 29 and 30 and forms a closure therefor. The flange 88 is secured to the frame 25 of the respective doors 23 and 123 through screws 89.

The operating mechanism B consists of a base 90 on which is mounted an electric motor 91. This motor operates through a shaft 92 and a suitable power transmission 93, a switch operating device 94 which in turn closes a plurality of switches 95 controlling the operation of the electromagnets 58. As motor 91 continues to operate successive switches 95 are closed, thereby successively operating the various members 14 and procuring the desired indication. At the same time shaft 92 operates a carriage 96 which carries a control switch 97. Control switch 97 is operated through a swinging arm 98 which is actuated through a temperature controlled device indicated in its entirety by the reference numeral 99. This device includes a thermometer bulb 100 which is situated at the locality where the temperature is to be measured. These various parts will now be described in detail.

The entire operating device B is mounted upon a table 105, having a table top 106 which is supported on legs 107. The legs 107 are secured together and braced through rails 108 connected to said legs. The base 90 is preferably constructed as a rectangular casting of suitable dimensions to support the various parts and is secured to the table 105 through bolts or screws 109.

Motor 91 is constructed in the usual manner, having a field 110 to which are attached end bells 114 and 115 which provide bearings 116 for supporting the armature shaft 117 of the motor. Motor 91 is attached to the base 90 through legs 118 which are attached to the field 110 and which are secured to said base through screws 119. Motor 91 is a series motor provided with a field coil 302 and an armature 301.

The transmission 93 consists of a case 120 which is best illustrated in Figs. 10 and 11. This case is formed with a flange 121 which fits against the end of the end bell 114. Bolts 122 extending through said flange and threaded into said end bell serve to attach the case to the motor. Case 120 is constructed to form a chamber 124 in which the transmission gearing of the invention is disposed and provides bearings for the various shafts of the same. For this purpose case 120 is constructed with bosses 125 and 126 which are bored to receive two bushings 127 and 128. Bushing 128 is threaded into the boss 126 and may be adjusted to take up end play, said bushing being held in adjusted position through a lock nut 129. A shaft 130 is journaled in the two bushings 127 and 128. In addition two other bosses 131 and 132 are provided which are bored and threaded to receive two threaded bushings 133 and 134. These bushings are also held in adjusted position through lock nuts 135 and 136 screwed upon the same and against the ends of the bosses 131 and 132. A shaft 137 is journaled in the two bushings 133 and 134.

The motor shaft 117 extends into chamber 124 and has attached to the end thereof a worm 138 which is adapted to mesh with a worm wheel 139 secured to the shaft 137. Shaft 137 is further provided with a worm 338 which in turn meshes with a worm wheel 339 fast on shaft 130. Through the action of the said reduction gearing, shaft 130 is rotated at a reduced rate of speed. The worm gear 339 is mounted against a collar 140 formed on shaft 130 and is held against said collar through a nut 141 threaded upon said shaft. Worm gear 339 may be keyed to the said shaft through a key 142. Worm gear 139 is similarly secured to the shaft 137. End play in the shaft 130 is taken up through a ball 143 mounted at the end of said shaft and seated in a socket 144 in the end of the bushing 128. End play is similarly taken up at shaft 137 through balls 145 and 146 mounted in the ends of said shaft and seated in sockets 147 and 148 in the two bushings 133 and 134.

Shaft 130 drives the shaft 92 previously referred to. The latter shaft is concentrically situated with respect to shaft 130 and is journaled in two bearings 347 and 348 cast on the base 90 and extending upwardly therefrom. This shaft is connected to the shaft 130 through a coupling 149 and is further provided with a universal joint 150 by means of which absolute alignment of the two shafts is rendered unnecessary. Shaft 92 is held from endwise movement with respect to the bearings 347 and 348 through two collars 151 and 152 which are mounted upon said shaft adjacent the facing ends of said bearings. Shaft 92 has secured to it a spur gear 153 which meshes with a spur pinion 154 fast on a countershaft 155. Countershaft 155 is journaled in two bearings 156 and 157 which are cast on the base 90. These bearings are bored to receive bushings 158 which are constructed similar to the bushings 128 previously referred to and which are held in adjusted position with respect to said bearings through lock nuts 159. The shaft 155 is also held from endwise movement through balls similar to those used in conjunction with shafts 130 and 137.

The carriage 96 is constructed in the shape of a gear segment having a radial portion 160 formed with worm gear teeth 161 at the segmental edge thereof. These teeth are adapted to mesh with a worm 162 on shaft 155. The member 96 is of relatively large dimensions and difficulty is encountered in causing the teeth thereof to be retained in mesh with the worm 162. This is overcome through a guide 163 which is shown in detail in Fig. 13. This guide includes a block 164 and a cap 165 therefor which are both bolted to the base 90 through bolts 166. The block 164 and cap 165 are jointly bored at 167 to receive the worm 162 and are further slotted at 168 to receive the marginal portion of the carriage 96. Said portion of the carriage fits snugly between the two parts of the guide and is hence held in mesh with the threads of the worm 162 thereby causing positive action of the carriage through rotation of shaft 155.

For the purpose of pivotally supporting the carriage 96, a mounting 169 is employed which comprises a base portion 170 adapted to rest upon the base 90. Base portion 170 is pivotally attached to base 90 through a screw 320 threaded into said base and is provided with two slots 171 through which two other screws 172 extend, which screws are also threaded into the base proper 90. By means of this construction the mounting 169 may be shifted in a manner to bring the teeth 161 of segment 96 into proper mesh with the threads of the worm 162. For the purpose of adjusting the mounting 169 and for moving it toward and from the shaft 155 an eccentric adjustment is employed which is illustrated in detail in Fig. 15. A slot 372 is formed in the base portion 170 of mounting 169 and an eccentric 173 fitted within the same. This eccentric is constructed with a hexagon head 174 by means of which the said eccentric may be rotated and is bored eccentrically at 175 to receive a pin 176 serving as a shaft about which the said eccentric is rotatable. Pin 176 is preferably in the form of a screw and is threaded into the base 90 as designated at 177. When the eccentric 173 has been adjusted through application of a wrench to the wrench head 174 the same may be locked in adjusted position through the screw 176.

The worm gear segment or carriage 96 is journaled for rotation in a structure illustrated in detail in Fig. 12. On the mounting 169 is an upwardly extending bearing block 178 which is formed with a horizontal slot 179, providing two spaced horizontal lugs 180 and 181. The portion 160 of carriage 96 extends into the slot 179 and has mounted in it a flanged bushing 182. This bushing is journaled on a stub shaft 183 which is received within a bore 184 formed in the lug 181. The upper end of the shaft 183 is threaded as designated at 185 to screw into the lug 180. The threaded portion 185 is of larger diameter than the portion 183 to provide a downwardly facing shoulder 186. A washer 187 encircles the shaft 183 and bears down upon the upper surface of the portion 160 of gear segment 96. A similar washer 188 is disposed below the flanged bushing 182. By screwing the shaft 183 downwardly, pressure is applied to the assembled structure through the washers 187 and 188, whereby end play is entirely eliminated. Shaft 183 may be held in adjusted position through a lock nut 189 which is threaded upon the threaded end 185 of said shaft and which abuts against the upper surface of the lug 180.

The temperature controlled device 99 consists of a flattened hollow tube 190 frequently referred to as a Bourdon tube which is wound in the form of a spiral. The inner end 191 of the said tube is attached to a support 192 and is in communication with another tube 193 leading from the device. The outer end 194 of the tube 190 is closed and is free to move in accordance with pressure set up within the tube as will be presently described in detail. Tube 193 is attached to the base 90 through a clamp 394 and extends outwardly beyond the operating mechanism being ultimately connected to the bulb 100. The tube 193 and bulb 100 are all preferably filled with mercury or some other suitable fluid capable of expanding upon increased temperature. The bulb 100 is situated at the locality where the temperature is to be measured and the mercury contained within the same is caused to expand or contract as the temperature increases or decreases. When the mercury in the bulb 100 expands a pressure is set up in the Bourdon tube 190 and the free end 194 of said tube is caused to move in the arc of a circle toward the right as viewed in Fig. 6. Such movement of the tube 190 is proportional to the change in temperature and is utilized to operate the indicating mechanism A previously referred to.

Figure 6:
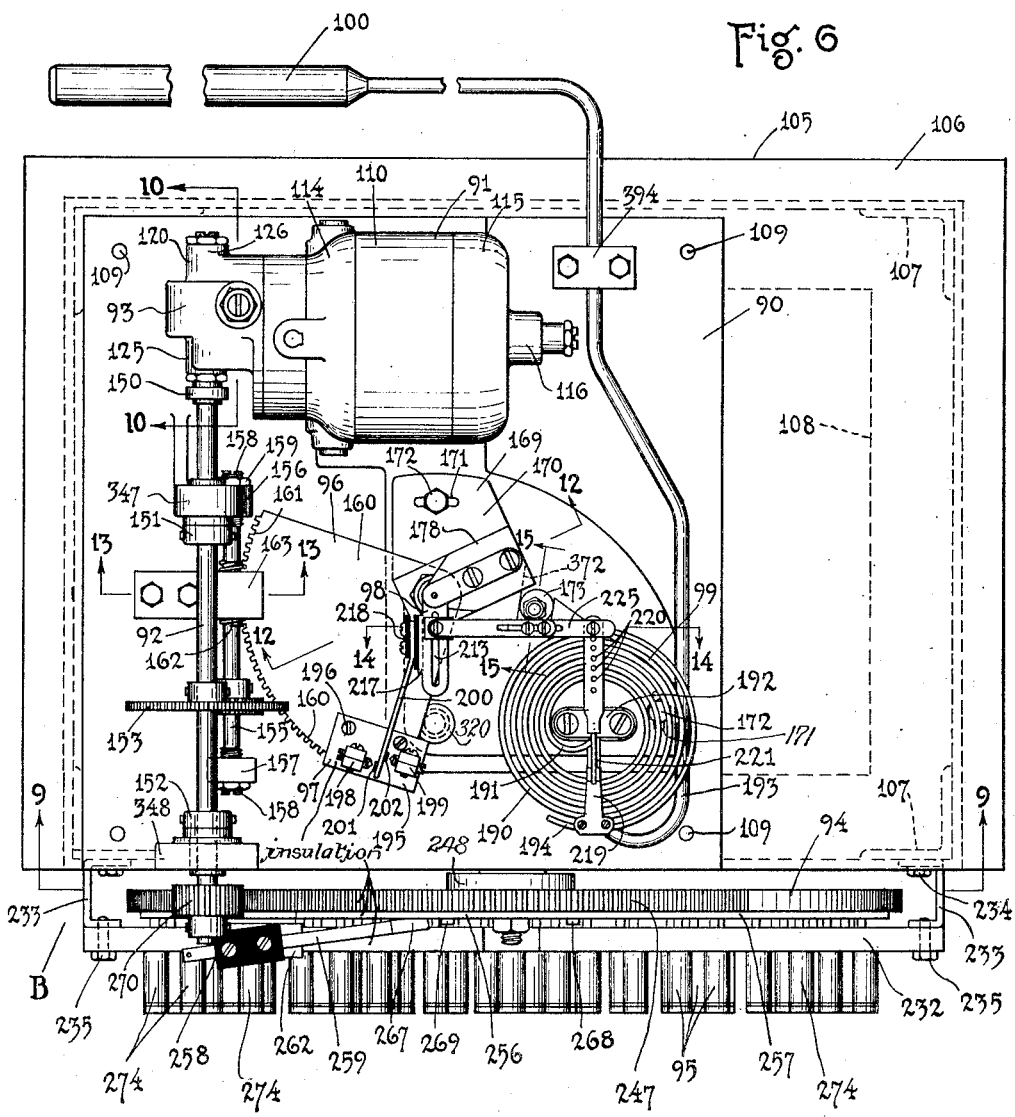
Fig. 6 is a plan view of the operating mechanism of the invention.
Figures 7, 9:
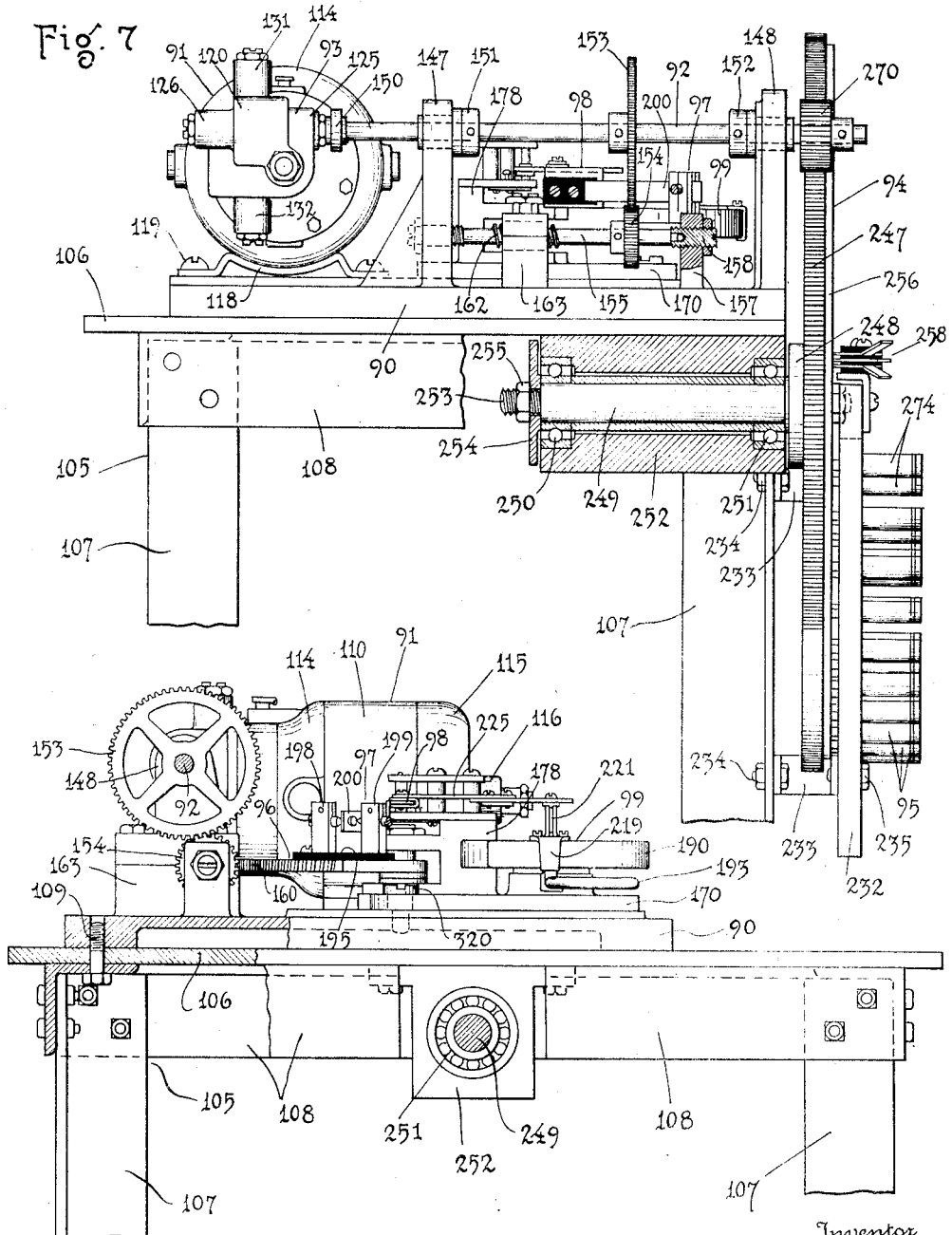
Fig. 7 is a side elevational view of the structure shown in Fig. 6 with portions thereof illustrated in section.
Fig. 9 is an elevational sectional view taken on line 9—9 of Fig. 6.

The control switch 97 is best shown in Fig. 6 and comprises an insulating member 195 which is attached to the portion 160 of the carriage 96 through screws 196. This insulating member carries two adjustable contacts 198 and 199. The arm 98 previously referred to carries a contact finger 200 which is constructed with two contacts 201 and 202 adapted to engage the contacts 198 and 199 respectively. This finger and the arm 98 are supported through the mounting 169 as best shown in Fig. 12. Attached to the upper end of the bearing block 178 through screws 203 is a bearing plate 204. A similar bearing plate 205 is attached to the bearing plate 204 through two spaced studs 206 which are riveted to the plate 204. Machine screws 207 extend through the plate 205 and are threaded into the two studs 206. By means of this construction plate 205 is demountably attached to plate 204 in spaced relation thereto. The two plates 204 and 205 are drilled at 208 and 209 to form bearings for a spindle 210. Spindle 210 is reduced at its ends as indicated at 211 to form trunnions by means of which the spindle is journaled in the plates 204 and 205 and by means of which longitudinal movement of the said spindle is prevented. The arm 98 previously referred to is preferably constructed of sheet metal and is attached to a bushing 212 secured to spindle 210. End thrust from spindle 210 is transmitted through a ball bearing 214, engaging the end of said spindle to a leaf spring 215 secured to the underside of plate 204. By means of a screw 216 threaded in the plate 204 the position of the ball 214 may be varied so as to take up the end play in the spindle 210. Arm 98 is constructed with a slot 213 extending longitudinally thereof and is further provided with a flange 217 depending therefrom. This flange has attached to it the finger 200 which is insulated therefrom through pieces of insulating material 218.

Finger 200 serves to operate the switch 97 and is itself operated from the temperature controlled device 99. This is accomplished as follows: Attached to the end 194 of tube 190 is an arm 219 which is constructed at its outer end with a number of holes 220. Arm 219 has mounted in it a strip of bimetal 221 by means of which compensation for operation of the device at different temperatures is procured. The arm 219 and the tube 190 are so designed that the portion of the arm formed with the openings 220 travels about the center of the spiral as an axis, the movement itself being directly proportional to the temperature of the mercury within the bulb 100. For operating arm 98 from arm 219, a linkage is employed which is shown in detail in Fig. 14. Fitting over the arm 98 is a U-shaped clamp 222. This clamp is threaded to receive a screw 223 which passes through the slot 213. Screw 223 is constructed with an enlarged shank 224 which forms a bearing for a jointed link 225. Link 225 is constructed in two sections 226 and 227 which are both slotted as designated at 228 and 229 and which may be secured together through bolts 230. The link 225 is further pivoted through a bolt 231 to the arm 219. This bolt is adapted to extend through the said link and through any of the holes 220 in the arm 219. As the arm 219 swings, arm 98 is caused to swing in the opposite direction. The link 225 is adjustable in length and the limits of the lever arms of the two arms 98 and 219 may be adjusted so that the indicating device A operates to indicate accurately the temperature at the bulb 100.

Figure 8:
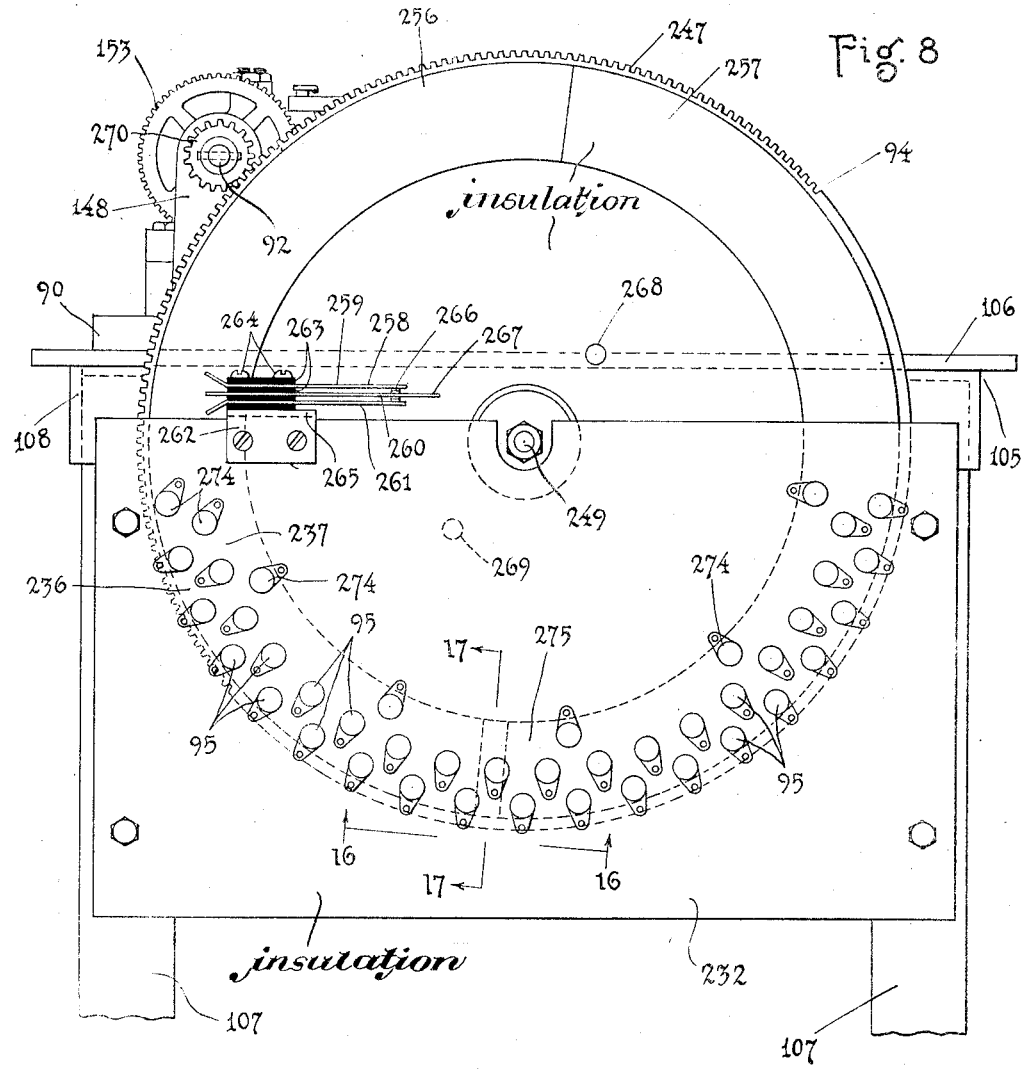
Fig. 8 is an end elevational view of the structure shown in Fig. 6.

The switches 95 previously referred to serve to operate the various electro-magnets 58 which control the movement of the members 14. These switches and the operating mechanism therefor will now be described in detail. On the side of the table 105 is a vertically disposed board 232 which is attached to said table through struts 233. These struts are U-shaped in form and are bolted to the legs 107 through bolts 234 and are further bolted to the board 232 through bolts 235. The board 232 may if desired be constructed of insulating material or the same may be constructed of any other suitable material. The various switches 95 are identical in construction and are mounted on the said board in arcuate formation, being arranged in two concentric rows indicated at 236 and 237 in Fig. 8.

One of the switches 95 is shown in detail in Fig. 17. This switch includes a bushing 238 which is bored at 239 to receive the stem 240 of a plunger 241. Plunger 241 is constructed with a head 242 of larger dimensions than the stem 240 which head is slidably received within an enlargement 243 of the bore 239. A compression coil spring 244 is seated at one end against the head 242 and urges the stem 240 of plunger 241 outwardly. spring 244 is further seated against a screw 245 which is threaded into the outer end of the bushing 238. The bushing 238 is reduced in diameter at the end thereof through which the bore 239 extends and is exteriorly threaded as designated at 246 to screw into the board 232. The plungers 241 serve as contacts of the switches 50 and contact with the other switch elements thereof, which will now be described in detail.

The switch operating device 94 comprises a spur gear 247 which is constructed of some suitable insulating material such as any of the phenol formaldehyde products. This gear is concentrically mounted with respect to the center of the rows 236 and 237 of switches 95 and is attached to a hub 248 carried on a stub shaft 249. Shaft 249 is journaled in ball bearings 250 and 251 which are secured in a mounting 252 attached to the underside of the table top 106 of table 105. The end 253 of shaft 249 is threaded to receive an end plate 254 by means of which end play of the shaft 249 is taken up. A nut 255 threaded upon the threaded end 253 of shaft 249 holds the plate 254 in place. Attached to the gear 247 is a segmental shaped contact 256. A second segmental shaped member 257 is also attached to the gear 247 and is disposed to lie in continuation of the segment 256 to form a complete circular member against which the various plungers 241 may ride. Member 257 is constructed of insulating material and serves merely as a blank for maintaining the surface along which the plungers 241 ride of the same height as the surface procured upon contact 256. When the various plungers engage the contact 256 the circuits through the switches 95 are closed and when the said plungers engage the member 257 the circuits through the various switches 95 are open.

For the purpose of conducting current to the contact segment 256 a number of switches 274 similar to the switches 95 are employed, a number of which are arranged in a row concentric with the two rows 236 and 237 and within the same, said row being designated by the reference numeral 275. One or more of these switches is always in contact with the segment 256 whereby current is fed to the said segment to be distributed through the various switches 95.

Attached to the board 232 is a limit switch 258 by means of which injury to the mechanism is prevented in the event that the temperature goes beyond the limits of the thermometer or in the event that the control switch fails to function. This switch comprises three flexible switch leaves 259, 260 and 261 which are mounted upon a mounting 262 and insulated from one another through pieces of insulating material 263. Screws 264 extend through the said leaves and through the insulation 263 and are threaded into a flange 265 formed on the mounting 262. These screws are insulated from the switch leaves 259, 260 and 261. The switch leaves have suitable contacts 266 attached thereto by means of which circuits through the said leaves are completed. Switch leaf 260 extends outwardly beyond the leaves 259 and 261 as indicated at 267 to form a finger adapted to be engaged by either of two stops or pins 268 and 269 mounted on the gear 247. When pin 268 strikes the finger 267 the circuit is broken through one of the switch leaves and when pin 269 strikes the finger 267 the circuit is broken through the other two switch leaves. The manner of connecting these switches will be presently described in detail.

The gear 247 is driven from a spur pinion 270 mounted upon the end of shaft 92. This shaft causes the gear 247 to rotate and to operate successively the various switches 95. Due to the worm gears used in the transmission 93, the shaft 92 becomes locked when the motor stops and the gear 247 is thus held immovable after the motor is off so that accidental closing or opening of switches 95 is entirely prevented.

In the operation of the switches 95 it becomes desirable to prevent undue arcing between the contact segment 256 and the contact plungers 240 when the circuits through the same are broken through the rotation of the gear 247. Toward this end three auxiliary contacts 271, 272 and 273 are employed which are insulated from one another and from the contact 256 and which are disposed at one end of contact 256. These contacts are secured to the gear 247 through screws 276 (Fig. 16) which pass through the said gear and are tapped into said contacts. All of these contacts are slightly raised above the level of the contact segment 256 and the insulating segment 257 and are formed with beveled edges. When the gear 247 travels in one direction the stems 240 of plungers 241 strike the said beveled edges and the plungers are raised directly away from the contact 256 and arcing caused to occur between the parallel surfaces thereof. In addition plungers 241 leave the contact surfaces more rapidly than would otherwise be possible. When the gear 247 travels in the opposite direction the plungers rest upon the surfaces of the contacts 271, 272 and 273 and do not engage the contact 256 until they pass by the said auxiliary contacts. When they finally engage contact 256 they engage the said contact squarely and throughout an appreciable area to greatly reduce arcing.

To prevent short circuiting between switches in the several rows the three auxiliary contacts 271, 272 and 273 are used instead of a single contact. With this construction the switches of each row are caused to engage one only of the raised contacts thereby preventing the undesired short circuiting.

Figure 19:
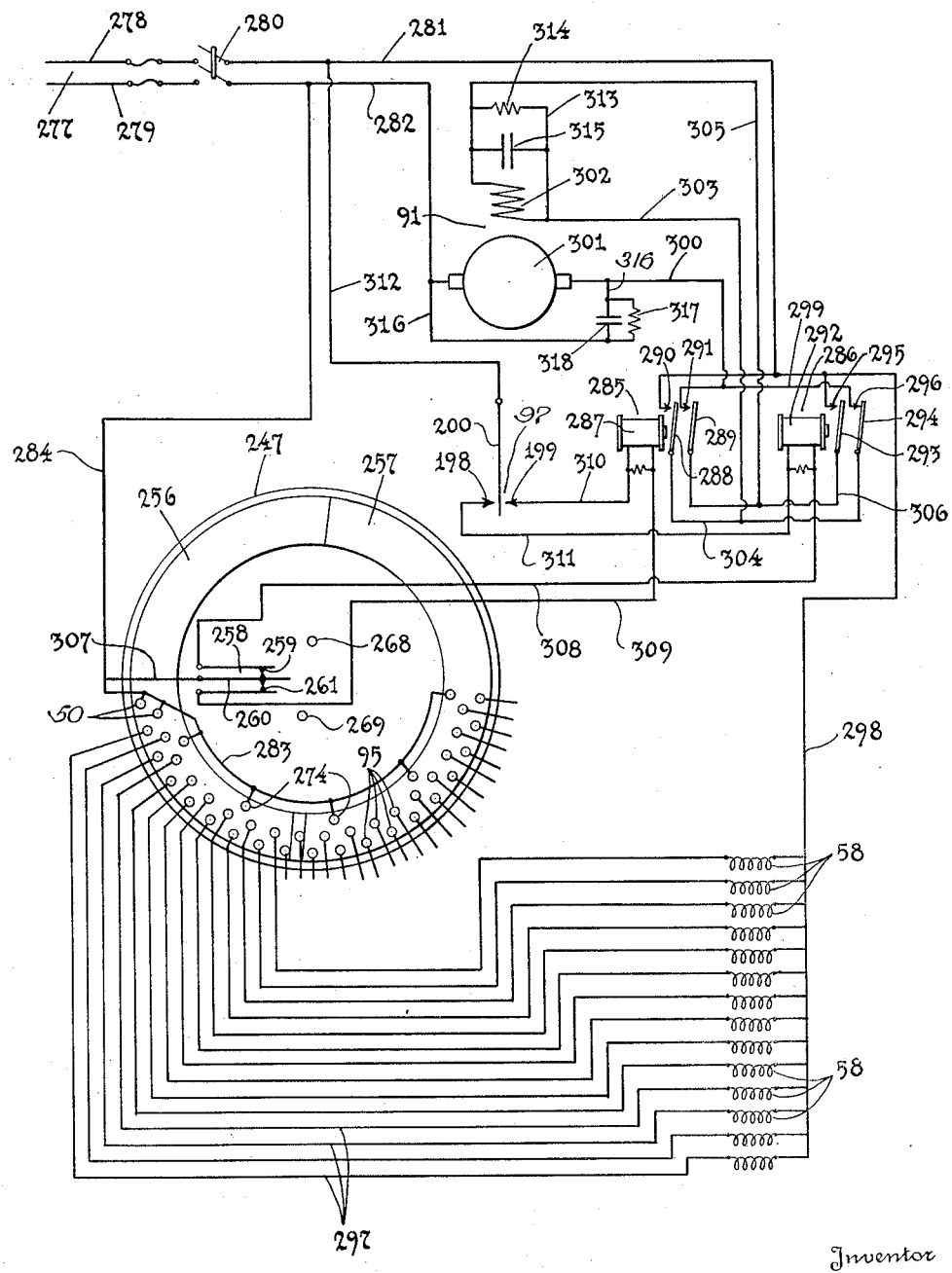
Fig. 19 is a wiring diagram of the invention.

For the purpose of controlling the operation of the operating device, two relays 285 and 286 are employed, which are shown in Fig. 19. Relay 285 consists of a coil 287, two contact arms 288 and 289 and two contacts 290 and 291 adapted to contact with the said contact arms. Relay 286 includes a coil 292, contact arms 293 and 294 and two contacts 295 and 296 adapted to contact with said arms. These relays are connected in the system as will be presently described in detail.

The method of connecting up the various switches and electrical devices of the invention is shown in the wiring diagram in Fig. 19. In this figure the power line is indicated at 277 which consists of two leads 278 and 279. A line switch 280 is employed by means of which the apparatus may be connected to or disconnected from the line. To this switch are connected two leads 281 and 282 which furnish current to the various apparatus. All of the plungers of switches 274 are connected together through a common conductor 283 which in turn is connected to a conductor 284 connected to the lead 282 previously referred to. The plungers of the various switches 95 are all connected through conductors 297 with the various electromagnets 58, the said switches and electromagnets being arranged in the same order. The other terminals of the electromagnets 58 are connected to a common conductor 298 which is connected to contact 290 of relay 285 and to contact 295 of relay 286. This conductor is also directly connected to lead 281 from line 277. The other two contacts 291 and 296 of relays 285 and 286 are connected together through a conductor 299 which in turn is connected through a conductor 300 with one side of the armature 301 of motor 91. Motor 91, as previously stated, is a series wound motor whose field coil 302 is adapted to be connected in series with its armature 301 and by means of which reversal of rotation of the motor can be procured. The other side of the armature 301 of motor 91 is directly connected to conductor 282. The series field 302 of motor 91 is connected through another conductor 303 which in turn is connected to still another conductor 304. This latter conductor is connected to the switch arm 288 and to the switch arm 294. The other side of the field 302 is connected through a conductor 305 to another conductor 306. Conductor 306 is connected to the two relay arms 289 and 293.

The limit switch 258 is connected into the circuit as follows: Leaf 260 is connected through a conductor 307 with conductor 284. Switch leaf 259 is connected through a conductor 308 with one side of the coil 292 of relay 286. Switch leaf 261 is connected through a conductor 309 with one side of the coil 287 of relay 285. The other sides of these coils are connected through conductors 310 and 311 respectively with the contacts 198 and 199 of switch 97. Contacts 201 and 202 of this switch are connected together and to the finger 200, which in turn is connected through a conductor 312 with lead 281.

To prevent sparking in the turning on and off of the motor 91 the series field coil 302 thereof is protected through a shunt circuit 313. This shunt circuit includes an inductance 314 and a condenser 315 connected in parallel in said circuit. In like manner the armature 301 is protected through a shunt circuit 316 which contains an inductance 317 and a condenser 318 in parallel in said circuit.

The operation of my invention is as follows: Assume the temperature to be, say, 72 degrees, with the device in normal position. Carriage 160 at such temperature is situated at a certain position corresponding to said temperature and the temperature controlled device is also at a position corresponding to such temperature. At such position finger 200 is midway between the two contacts 198 and 199 and the circuits through the two relays 285 and 286 are open. These two relays control motor 91 which is normally stationary. At the same time that carriage 160 is in a certain position due to the particular temperature, gear 247 which is directly connected to the shaft 92 which in turn controls the position of carriage 160 is also in a predetermined position. In such position certain of the switches 95 to the left of the contacts 271, 272 and 273 are in contact with the contact segment 256 and are closed. Circuits may be traced through these switches as follows: Such circuits include lead 282 from line 277, conductor 284, switch 274 which feeds the current to switch contact segment 256, the particular switches 95 whose plungers contacting with contact segment 256 and the conductors 297 between the said switches and the respective electromagnets 58. These circuits further include the conductor 298 and the lead 281. It will thus be seen that such switches 95 whose plungers contact with the contact segment 256 are closed and current maintained through the magnets 58 controlled thereby. These electromagnets are the electromagnets which control the members 14 below the graduation mark 72 on the scale 12. In Fig. 3 the position of the said members 14 when the electromagnets are energized can be seen. In such position the colored areas 104 of the said members are brought into register with the window 13. Inasmuch as all of the members below the temperature mark are simultaneously operated, the appearance of a colored column is given which extends up to the particular graduation corresponding to the temperature of the bulb 100 of the thermometer. For the sake of explanation assume that the temperature increases. The mercury within the bulb 100 then expands and the spiral tube 190 straightens out. This causes the end 194 of the said tube to move toward the right as viewed in Fig. 6 and the arm 219 to move in a counter-clockwise direction. This causes the said arm to swing as about a center coinciding with the center of the spiral tube 190 and through the action of link 225 and arm 98 to move the contact finger 200 in a clockwise direction. Upon movement of said arm in such manner contact 201 engages contact 198 and a circuit through said contacts is completed. Current flows through this circuit as follows: Commencing with lead 281 current flows through conductor 312, switch arm 200, contact 198, conductor 311, the coil 292 of relay 286, conductor 308, switch 258, conductor 307 and conductor 284 back to lead 282. This energizes relay coil 292 and the two relay arms 293 and 294 are drawn inwardly and into contact with contacts 295 and 296. This completes another circuit. This circuit energizes the armatures 301 of motor 91 and the field 302 of said motor. This circuit includes armature 301 which is directly connected to lead 282, conductor 300, conductor 299, contact 296, arm 294, conductor 304, conductor 303, field 302, conductor 305, conductor 306, arm 293, contact 295, conductor 298 and lead 281.

When the relay 286 is operated, current is furnished which energizes both the field and armature of the motor 91, the said field and armature being connected in series and the current entering a certain end of the field 302. This causes rotation of motor 91 in such a direction that the gear segment 160 is given a clockwise rotation as viewed in Fig. 6. Rotation of the shaft 92 through motor 91 also procures rotation of gear 247. Gear 247 rotates in a counter-clockwise direction as viewed in Fig. 8 and causes the contact segment 256 to engage further of the switches 95. This causes additional electromagnets to become energized and the corresponding members 14 to be actuated. As the gear segment 160 rotates, pressure upon the finger 200 is reduced until finally the contact 198 leaves contact 201 breaking the circuit through the relay coil 292. This de-energizes relay 286 and the circuit through motor 91 is opened which terminates the operation of the said motor and leaves the switch operating device 94 at a fixed position. Such position corresponds to the new temperature and is procured by adjusting the linkage for operating finger 200 so that the required number of members 14 are actuated to correctly show the actual temperature.

Upon a reduction of temperature the mercury within the bulb 100 contracts and the arm 219 moves in a clockwise direction, swinging finger 200 in a counter-clockwise direction. This causes the said finger to bring contact 202 in engagement with contact 199. The circuit controlling motor 91 is now closed through relay 285. This circuit includes conductor 312, contact finger 200, contact 199, conductor 310, relay coil 287, conductor 309, switch leaf 261, switch leaf 260, conductor 307, conductor 284 and lead 282. This causes the relay 285 to be energized, closing the circuit through the relay arms 288 and 289. This completes the circuit through motor 91 which comprises lead 282, armature 301, conductor 300, conductor 299, contact 291, relay arm 289, conductor 306, conductor 305, field coil 302, conductor 303, conductor 304, relay arm 288, contact 290, conductor 298 and the lead 281. It will be noted that current enters the armature 301 in the same direction but enters the field coil 302 at the opposite end thereof. This causes reversal of motor 91 which causes the segment 160 and the gear 247 to travel in the opposite direction. Segment 160 again travels until the circuit is broken through switch 97, which terminates the movement of the gear 247. A corresponding number of members 14 are cut out until the indication at the column 15 is proper. In this manner indication of temperature is accurately procured through the composite column of members 14 which indication corresponds to the temperature at the bulb 100.

In the event that the motor 91 fails to cut off by sticking of the switch 97, or in the event that extremely high or low temperatures are reached, the gear 247 will continue to rotate and likewise the segment 160 which would cause breakage or injury to the apparatus. For this purpose the switch 253 is employed. When either of the two pins or stops 269 or 268 engage the projecting portion 267 of switch leaf 266 the said switch is opened which causes the particular relay 285 or 286 connected through said switch to become de-energized. This stops motor 91. In this manner the movement of the gear 247 terminates when the same has traveled through half a revolution whether in one direction or the other. With this construction, injury to the apparatus is prevented.

My invention is highly advantageous in that a positive and practical device is provided whereby a temperature indicating device simulating in appearance a thermometer may be provided and positively operated. By means of my invention, accurate readings can be procured. My device depends upon the expansion of a liquid and is so designed that the movement of the expansible member is directly proportional to the temperature of the liquid. In this manner a uniform scale may be procured for the thermometer. By means of the adjustable linkage used in connecting the control switch with the actuating device, the thermometer may be adjusted to cause the same to accurately indicate actual temperatures. My invention is extremely sensitive and can be made to indicate to degrees or fractions of degrees as desired by the selection of the proper number of indicating members and the relative height of the same with respect to the graduations of the scale. Under ordinary temperature in the event that current should be cut off, my invention immediately indicates the minimum temperature due to the fact that the springs 76 move the members 14 so as to expose surfaces 101 and 102 thereof when the magnets 58 are deenergized thereby informing the observer that the apparatus is no longer functioning. In this manner erroneous readings which might be procured through the shutting off of current are entirely prevented.

Changes in the specific form of my invention, as herein disclosed, may be made within the scope of what is claimed without departing from the spirit of my invention.

Having described my invention, what I claim as new and desire to protect by Letters Patent is:

1. A control device comprising a pivoted member, a switch carried by said pivoted member, a pivoted arm for operating said switch, an actuating device having a swinging part, a link between said swinging part and said arm, pivots for pivoting said link to said swinging part and said arm, and means for varying the lever arm of one of said pivots.

2. A control device comprising a pivoted member, a switch carried by said pivoted member, a pivoted arm for operating said switch, an actuating device having a swinging part, a link between said swinging part and said arm, pivots for pivoting said link to said swinging part and said arm, means for independently varying the lever arms of said pivots.

3. A control device comprising a pivoted member, a switch carried by said pivoted member, a pivoted arm for operating said switch, an actuating device having a swinging part, a link between said swinging part and said arm, pivots for pivoting said link to said swinging part and said arm, and means for varying the distance between said pivots.

4. A control device comprising a pivoted member, a switch carried by said pivoted member, a pivoted arm for operating said switch, an actuating device having a swinging part, a link between said swinging part and said arm, pivots for pivoting said link to said swinging part and said arm, means for varying the lever arm of one of said pivots and means for varying the distance between said pivots.

5. A control device for a thermometric indicator which includes a plurality of successively operated indicating members, said control device comprising a horizontal support and a vertical support, a plurality of switch elements carried by said vertical support and arranged in concentric relation about a horizontal axis, a shaft coaxially disposed with reference to the axis of said switch elements, complemental switch means for coacting with said switch elements, and forming in conjunction therewith a plurality of switches, means carried by said shaft for operating said switches, a gear secured to said shaft, a shaft overlying said horizontal support, a gear on said second named shaft meshing with said first named gear, reversible drive means for rotating said second named shaft in either direction, a third shaft overlying said horizontal support, drive means between said second and third shafts, an actuating device mounted on said horizontal support and adapted to occupy different positions and moved into said positions by said third shaft, thermostatic means adapted to occupy positions corresponding with the positions of said actuating device, and switch means conjointly controlled by said actuating device and said thermostatic means and controlling the operation of said drive means.

6. A control device for a thermometric indicator which includes a plurality of successively operated indicating members, said control device comprising a horizontal support and a vertical support, a plurality of switch elements carried by said vertical support and arranged in concentric relation about a horizontal axis, a shaft coaxially disposed with reference to the axis of said switch elements, complemental switch means for coaction with said switch elements, and forming in conjunction therewith a plurality of switches, means carried by said shaft for operating said switches, a gear secured to said shaft, a shaft overlying said horizontal support, a gear on said second named shaft meshing with said first named gear, reversible drive means for rotating said second named shaft in either direction, an actuating device mounted on said horizontal support and adapted to occupy different positions and moved into said positions by said second named shaft, thermostatic means adapted to occupy positions corresponding with the positions of said actuating device, and switch means conjointly controlled by said actuating device and said thermostatic means, and controlling the operation of said drive means.

7. A control device for a thermometric indicator which includes a plurality of successively operated indicating members, said control device comprising a horizontal support and a vertical support, a plurality of switch elements carried by said vertical support and arranged in concentric relation about a horizontal axis, a shaft coaxially disposed with reference to the axis of said switch elements, complemental switch means for coaction with said switch elements, and forming in conjunction therewith a plurality of switches, means carried by said shaft for operating said switches, a shaft overlying said horizontal support, drive means between said second named shaft and said first named shaft and lying outwardly of said supports, reversible drive means for rotating said second named shaft in either direction, an actuating device mounted on said horizontal support and adapted to occupy different positions and moved into said positions by said second named shaft, thermostatic means adapted to occupy positions corresponding with the positions of said actuating device, and switch means conjointly controlled by said actuating device and said thermostatic means, and controlling the operation of said drive means.

8. A control device for a thermometric indicator which includes a plurality of successively operated indicating members, said control device comprising a support, a plurality of switch elements carried by said support, and arranged in concentric relation about an axis, a shaft coaxially disposed with reference to the axis of said switch elements, complemental switch means for coaction with said switch elements and forming in conjunction therewith a plurality of switches, means carried by said shaft for operating said switches, a second shaft, drive means between the first and second shafts, reversible drive means for rotating said second named shaft in either direction, an actuating device adapted to occupy different positions and moved into said positions by said second named shafts, thermostatic means adapted to occupy positions corresponding with the positions of said actuating device, and switch means conjointly controlled by said actuating device and said thermostatic means, and controlling the operation of said drive means.

9. A control device for a thermometric indicator which includes a plurality of successively operated indicating members, said control device comprising a support, a plurality of switch elements carried by said support, and arranged in concentric relation about an axis, a shaft coaxially disposed with reference to the axis of said switch elements, complemental switch means for coaction with said switch elements, and forming in conjunction therewith a plurality of switches, means carried by said shaft for operating said switches, a second shaft, drive means between the first and second shafts, reversible drive means for rotating said second named shaft in either direction, a third shaft parallel with said second shaft, drive means between said second and third shafts, an actuating device adapted to occupy different positions and moved into said positions by said third shaft, thermostatic means adapted to occupy positions corresponding with the positions of said actuating device, and switch means conjointly controlled by said actuating device and said thermostatic means, and controlling the operation of said drive means.

10. A control device for a thermometric indicator which includes a plurality of successively operated indicating members, said control device comprising a plurality of separate operating circuits for operating said members, a switch element in each of said circuits, said switch elements being arranged in a circle, a rotary circuit closer for closing the circuits through said switch elements, an electric motor for rotating said rotary circuit closer, a gear driven by said motor, a control switch carried by said gear and controlling the operation of said motor, an arm coaxially journaled for rotation with respect to the axis of said gear, and functioning to operate said control switch, and thermostatically controlled actuating means for swinging said arm.

11. A control device for a thermometric indicator which includes a plurality of successively operated indicating members, said control device comprising a plurality of separate operating circuits for operating said members, a switch element in each of said circuits, said switch elements being arranged in a circle, a rotary circuit closer for closing the circuits through said switch elements, an electric motor for rotating said rotary circuit closer, a gear driven by said motor, a control switch carried by said gear and controlling the operation of said motor, an arm coaxially journaled for rotation with respect to the axis of said gear, and functioning to operate said control switch, an actuating device having a swinging part and linkage between the swinging part of said actuating device and arm for swinging said arm.

CLIFFORD C. SCHWEISO.